HENRY E. THOMAS.
Improvement in Covers for Pepper-Boxes.
No. 128,261. Patented June 25, 1872.
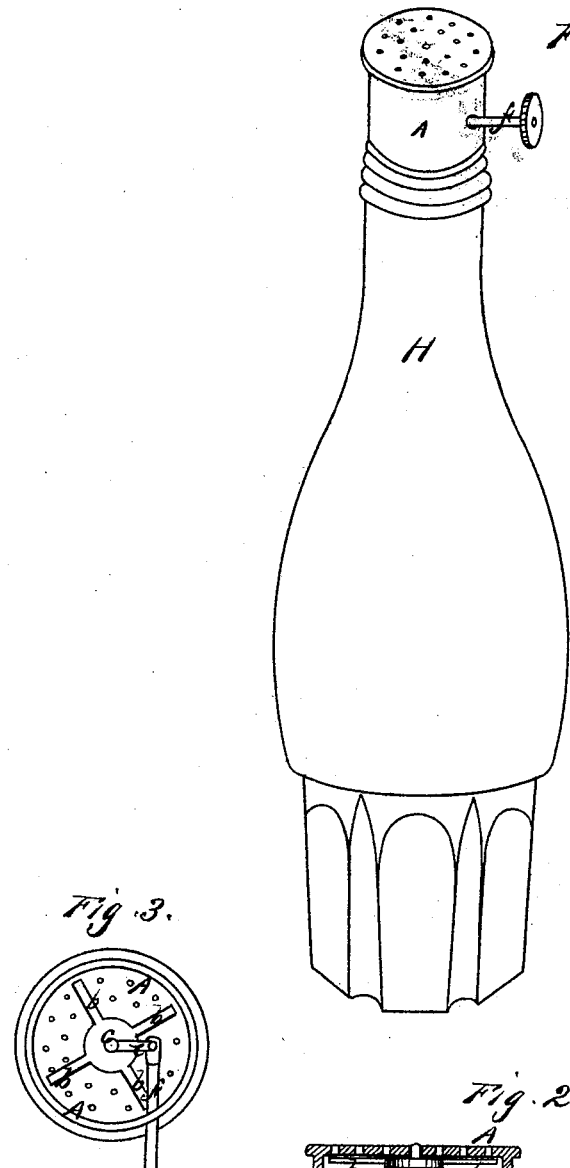
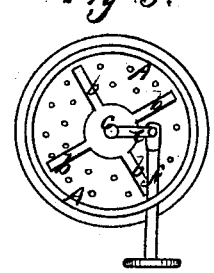
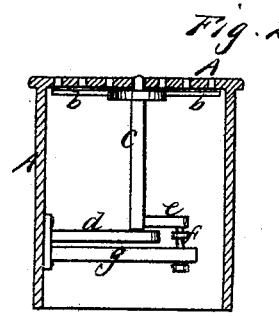
Witnesses
Alonzo Hughes
H. D. Mills
Inventor
Henry E. Thomas
by his attys
A. N. & R. K. Evans.

UNITED STATES PATENT OFFICE.

HENRY E. THOMAS, OF SAN FRANCISCO, CALIFORNIA.

IMPROVEMENT IN COVERS FOR PEPPER-BOXES.

Specification forming part of Letters Patent No. 128,261, dated June 25, 1872.

SPECIFICATION.

*To all whom it may concern:*

Be it known, I, HENRY E. THOMAS, of San Francisco, San Francisco county, State of California, have invented Improvements in Covers for Pepper-Holders; and I do hereby declare the following description and accompanying drawing are sufficient to enable any person skilled in the art or science to which it most nearly appertains to make and use my said invention or improvement without further invention or experiment.

The object of my invention is to provide a cover for spice-holders, and more particularly for pepper-boxes and bottles, by means of which the pepper or other condiment can be sprinkled or sifted over articles of food without shaking or striking the bottle or box, and thus avoid the danger of knocking off the cover and the consequent waste of pepper.

In order to describe my invention, so that others will understand its construction and operation, reference is had to the accompanying drawing forming a part of this specification, in which—

Figure 1 is a perspective view of my invention. Fig. 2 is an enlarged sectional view of the top. Fig. 3 is a bottom view of the top. A represents the perforated cover or top of any bottle or box containing a finely-ground or pulverized substance which it is desired to distribute or sprinkle over any surface.

In the case of a pepper bottle or box, it is frequently the case that the holes or perforations in the cover become clogged, in which case a vigorous shaking or striking of the bottle or box is necessary to obtain the desired amount of pepper; besides this, the pepper or other substance is liable to become packed in the neck of the bottle, so as to prevent its passing through the holes.

In order to remedy these difficulties I place inside of the cover a series of stirring-arms, $b\ b\ b$, which are secured upon a shaft, $c$, so as to be rotated back and forth, close against the perforated top A.

In the present application, an arm, $d$, is secured to the side of the cover A a short distance from the perforated top, and extends to the center of the cover. One end of the shaft $c$ then bears in the end of the arm $d$, while its opposite end bears in the center of the top, while the stirring arms are carried close up against the cover.

In order to operate the arms $b\ b$, a short crank arm, $e$, extends outward from the lower end of the shaft $c$, to which a push-pin, $f$, is loosely attached. The push-pin extends through a hole in the cover to the outside, where it is provided with a suitable head. A flat spring, $g$, has one end secured to the side of the cover, so as to extend out above the arm $d$ and bear against the crank-arm $e$, for the purpose of throwing the crank back after it has been pushed inward. When this cover is placed upon a bottle, H, it will only be necessary to operate the push-pin $f$ with one of the forefingers, so as to cause the stirring-arms to move back and forth over the perforations in the top. These arms not only prevent the pepper or other substance from clogging the holes, but keeps it in agitation, so as to prevent its packing. The crank-arm and spring also serve to agitate the pepper at a short distance from the stirring-arms, thus insuring a free and uninterrupted passage of the pepper or other substance to the stirrers.

By this means I obviate the difficulties usually encountered in using pepper and other boxes, and provide a convenient means for insuring a free passage of the substance without the necessity of shaking or striking the bottle or box.

Having thus described my invention, what I claim, and desire to secure by Letters Patent, is—

The shaft $c$, with its stirring-arms $b$ and crank-arm $e$, in combination with the push-pin $f$ and spring $g$, and perforated cover A, constructed and arranged to operate as described, for the purpose set forth.

In witness whereof I hereunto set my hand this 3d day of February, A. D. 1872.

HENRY E. THOMAS.

Witnesses:
C. M. RICHARDSON,
WM. GERLACH.